(12) United States Patent
Mukae

(10) Patent No.: US 6,402,332 B1
(45) Date of Patent: Jun. 11, 2002

(54) MIRROR SUPPORT STRUCTURE

(75) Inventor: Hisayuki Mukae, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/859,393

(22) Filed: May 18, 2001

(30) Foreign Application Priority Data

Oct. 13, 2000 (JP) ........................................ 2000-313452

(51) Int. Cl.$^7$ .............................................. G02B 7/182
(52) U.S. Cl. ...................... 359/881; 359/882; 359/871; 359/872; 359/850
(58) Field of Search ................................ 359/881, 882, 359/871, 872, 879, 880, 838, 850, 851; 248/476, 477, 478, 479; 343/742, 752, 881

(56) References Cited

U.S. PATENT DOCUMENTS

| | | | | |
|---|---|---|---|---|
| 3,761,934 A | * | 9/1973 | Terakawa | 343/752 |
| 4,229,742 A | * | 10/1980 | Rotunda | 343/742 |
| 4,404,565 A | * | 9/1983 | Gurney et al. | 343/881 |
| 4,441,812 A | * | 4/1984 | Feist | 356/147 |
| 4,750,002 A | * | 6/1988 | Kommineni | 343/915 |
| 5,113,588 A | * | 5/1992 | Walston | 33/264 |

FOREIGN PATENT DOCUMENTS

JP  3-161645  7/1991

* cited by examiner

*Primary Examiner*—Mohammad Sikder
(74) *Attorney, Agent, or Firm*—Burns, Doane, Swecker & Mathis, LLP

(57) ABSTRACT

A light-weight and highly rigid mirror support structure is provided which is capable of maintaining a relation between the relative positions of a main mirror and an auxiliary mirror even with environmental variations in the place of installation or deformations of a mounting surface, and of preventing a deformation of the main mirror and the auxiliary mirror which would otherwise cause performance deterioration. A main mirror (1) and an auxiliary mirror (2) are disposed a predetermined distance apart from each other in a face-to-face relation. A main mirror support member (3) and an auxiliary mirror support member (4) serve to support the main mirror (1) and the auxiliary mirror (2), respectively. A plurality of rods (15a) connect the main mirror support member (4) and the auxiliary mirror support member (4) with each other. A plurality of auxiliary rods (15b) are joined at one ends thereof to the main mirror support member (3) or the auxiliary mirror support member (4) and at the other ends thereof to a single connection point (A). A plurality of support legs (26) indirectly support the first and auxiliary mirrors (1), (2) at a total of three points including two points on the main mirror support member (3) and the single connection point (A) at which the auxiliary rods (15b) are joined together. The support legs (26) are fixedly mounted on a base panel (7). The support legs (26) are composed of follower members capable of following an expansion or contraction of the base panel (7).

7 Claims, 4 Drawing Sheets

MIRROR SUPPORT STRUCTURE

This application is based on Application No. 2000-313452 filed on Oct. 13, 2000, the contents of which are hereby incorporated by reference.

BACKGROUND OF THE INVENTION

1. Field of the Invention

The present invention relates to a mirror support structure for an optical sensor for sensing light or radio waves or an antenna for transmitting and receiving light or radio waves, which are adapted to be mounted on a moving object such as a satellite, or which are used under severe environmental conditions such as great temperature changes.

2. Description of the Related Art

FIG. 6 illustrates one example of such a known mirror support structure. In this figure, the known mirror support structure includes a main mirror 1, an auxiliary mirror 2 disposed in a face-to-face and spaced-apart relation with respect to the main mirror 1, a main mirror support member 3 in the shape of a triangular configuration with the main mirror 1 fixedly secured thereto, an auxiliary mirror support member 4 also of a triangular configuration with the auxiliary mirror 2 fixedly secured thereto, a plurality of rods 5 connecting the respective apexes of the triangular-shaped main mirror support member 3 and the respective apexes of the triangular-shaped auxiliary mirror support member 4, a plurality of support legs 6 supporting thereon the main mirror support member 3 and the auxiliary mirror support member 4, and a base panel 7 on which the support legs 6 are fixedly mounted.

With such a mirror support structure, the main mirror support member 3 and the auxiliary mirror support member 4 are arranged on the base panel 7 in such a manner that the relative positions of the main mirror 1 and the auxiliary mirror 2 can be placed in an optimal relation with respect to each other. The respective apexes of the main mirror support member 3 and the respective apexes of the auxiliary mirror support member 4 are connected with each other by means of the respective rods 5 so as to maintain the optimal relation between the primary and auxiliary mirrors 1, 2. In addition, the support legs 6 are secured at one ends thereof to the main mirror support member 3 or the auxiliary mirror support member 4 and fixedly mounted at the other ends thereof on the base panel 7. For example, in the case of an optical sensor to be installed on a satellite, it is impossible to mount the optical sensor on the satellite with a predetermined arrangement by positioning the base panel 7 in place on the satellite.

Moreover, FIG. 7 illustrates another example of a known mirror support structure. A main mirror support member 13 formed of a quadrangular panel is directly fixed to a base panel 7, and a plurality of support legs 16 each in the form of a rod serve to connect the opposite upper corner portions of the main mirror support member 13 and the base panel 7 with each other.

With the enhanced observation performance of optical sensors or radio wave sensors, and the improved performance of antennae due to the increasing transmission capacity of communications equipment in recent years, there has been a problem that the performances of the optical or radio wave sensors or antennae are adversely affected by the displacement or deformation of the mirror support structure caused by dimensional changes or environmental variations in the mirror support structure for maintaining the relative positional relation between the main mirror 1 and the auxiliary mirror 2.

That is, with the mirror support structure shown in FIG. 6, the dimensional change (expansions or contractions) and/or distortion of a mounting surface, to which the base panel 7 is fixedly secured, due to temperature changes would alter the relative positions or angles of the plurality of support legs 6, thus changing the relation between the relative positions of the main mirror support member 3 and the auxiliary mirror support member 4. As a result, there arises a problem in that the main mirror 1 and the auxiliary mirror 2 become unable to maintain the prescribed relation between their relative positions.

Furthermore, in the case of the known example of FIG. 7, in which the support legs 16 are only connected with the main mirror support member 13 but not with the auxiliary mirror support member 4, there is no such a problem as referred to above that the relative positions of the main mirror 1 and the auxiliary mirror 2 would be caused to change due to the expansion or contraction of the base panel 7. In this case, however, there arises another problem that the main mirror support member 13 would be caused to expand and contract or distort and deform due to external forces applied thereto by the connection portions thereof with the base panel 7 and/or the plurality of support legs 16, thus giving rise to adverse influences on the main mirror 1 mounted on the main mirror support member 13.

Besides, when a sensor or antenna is to be installed on an satellite, it is necessary to achieve a mirror support structure that is light in weight and high in rigidity, in order to avoid deterioration in performance which would otherwise be caused by vibrations during movement or launching thereof through a rocket.

SUMMARY OF THE INVENTION

The present invention is intended to obviate the above-mentioned problems, and has for its object to provide a light-weight and highly rigid mirror support structure of the character as described which is capable of maintaining, even with environmental variations in the place of installation and/or deformations of a mounting surface of a base panel, the relation between the relative positions of a main mirror and an auxiliary mirror in a proper manner, and of avoiding the deformation of the primary and auxiliary mirrors which would result in deterioration of the performance.

Bearing the above object in mind, according to the present invention, there is provided a mirror support structure comprising: a first mirror and a second mirror disposed a predetermined distance apart from each other in a face-to-face relation; a first mirror support member and a second mirror support member supporting the first mirror and the second mirror, respectively; a plurality of main rods connecting the first mirror support member and the second mirror support member with each other; a plurality of auxiliary rods joined at one ends thereof to the first mirror support member or the second mirror support member and at the other ends thereof to a single connection point; a plurality of support legs for indirectly supporting the first and second mirrors at a total of three points including two points on the first mirror support member and the single connection point at which the auxiliary rods are joined together; and a base on which the support legs are fixedly mounted; wherein the support legs are composed of follower members capable of following an expansion or contraction of the base.

The above and other objects, features and advantages of the present invention will become more readily apparent from the following detailed description of preferred embodiments of the present invention taken in conjunction with the accompanying drawings.

DESCRIPTION OF THE PREFERRED EMBODIMENTS

Now, preferred embodiments of the present invention will be described in detail while referring to the accompanying drawings. In the following description and the accompanying drawings, like or corresponding parts are identified by the same or like symbols.

Embodiment 1.

Figure 1:
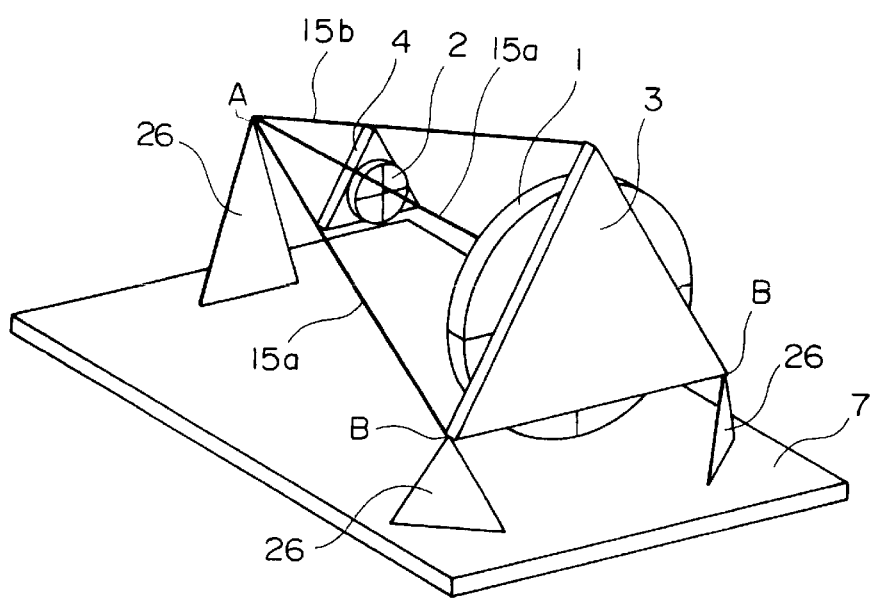
FIG. 1 is a perspective view illustrating a mirror support structure according to a first embodiment of the present invention.

FIG. 1 illustrates, in a perspective view, a mirror support structure according to a first embodiment of the present invention. In this figure, the mirror support structure of this embodiment includes a first mirror in the form of a main mirror 1, a second mirror in the form of an auxiliary mirror 2 arranged in an optimal relative positional relation with respect to the main mirror 1, a first support member in the form of a main mirror support member 3 of a triangular shape to which the main mirror 1 is fixedly secured, and a second support member in the form of an auxiliary mirror support member 4 of a triangular shape to which the auxiliary mirror 2 is fixedly secured.

A plurality of (e.g., three in the illustrated example) main rods 15a are secured at one ends thereof to the three apexes of the main mirror support member 3, respectively, and at the other ends thereof to the three apexes of the auxiliary mirror support member 4, respectively, for connecting the main and auxiliary mirror support members 3, 4 with each other. Also, a plurality of (e.g., three in the illustrated example) auxiliary rods 15b are connected at one ends thereof with three apexes of the auxiliary mirror support member 4, respectively, and at the other ends thereof with a single connection point A to be described later. The corresponding main and auxiliary rods 15a, 15b are formed into continuous and integral rectilinear configurations. A plurality of (e.g., three in the illustrated example) support legs 26, which act as follower members and are each composed of a triangular-shaped plate spring, serve to support, at their upper apex, two points or apexes B of the main mirror support member 3 and the connection point A at which the other ends of the auxiliary rods 15b are joined together. The triangular-shaped support legs 26 are fixedly secured at their base side to a base panel 7.

In this first embodiment, the corresponding main and auxiliary rods 15a, 15b are in the shape of continuously extending rectilinear configurations, and the one ends of the main rods 15a are joined to the three apexes of the triangular-shaped main mirror support member 3, respectively, whereas the other ends of the auxiliary rods 15b are joined together at the connection point A. Thus, three pairs of mutually connected main and auxiliary rods 15a, 15b cooperate to form a trussed structure including the three sides of the main mirror support member 3.

Moreover, the three support legs 26 individually joined to the two apexes B of the main mirror support member 3 and the connection point A are each formed of a triangular plate spring which has high rigidity and high strength against an in-plane external force acting on each support leg 26 in a direction parallel to the surface thereof, and which has a certain degree of elasticity acting in an out-of-plane direction (i.e., in a direction perpendicular to the surface of each plate spring). The three support legs 26 are arranged in such a manner that they have elasticity in directions different from each other.

With such a mirror support structure as described above, the main rods 15a, the auxiliary rods 15b, the three sides of the main mirror support member 3 and the three sides of the auxiliary mirror support member 4 together constitute a trussed structure, thus providing a light-weight and highly rigid mirror support structure. Moreover, since the main mirror 1 and the auxiliary mirror 2 are supported on the base panel 7 by means of the three support legs 26 alone, even if the base panel 7 is distorted or deformed in a direction perpendicular to the surface thereof, there will be no or little moment load transmitted to the main mirror support member 3 and the auxiliary mirror support member 4.

In addition, even with an expansion or contraction of the base panel 7 among the three support legs 26, the support: legs 26 composed of plate springs can follow the expansion or contraction of the base panel 7 whereby resultant expansion or contraction load will be prevented from being transmitted from the base panel 7 to the main rods 15a and the auxiliary rods 15b. As a consequence, even in the event there is an environmental variation in the installation place or deformation in the mounting surface for the mirror support structure, the relation between the relative positions of the main mirror 1 and the auxiliary mirror 2 is maintained properly to avoid the deformation of the main mirror 1 and the auxiliary mirror 2.

Some examples of using the mirror support structure of this first embodiment are an optical mirror in an optical sensor, a reflector in a radio wave sensor, an optical antenna in optical communications equipment, and an antenna in radio communications equipment.

In the case of the main and auxiliary mirrors 1, 2 being used as an optical sensor, unillustrated aligned holes are formed through the main mirror 1 and the auxiliary mirror 2 in their centers, and a light detector or a wave detector for sensing observation light or a signal is mounted on the back side of the main mirror support member 3 opposite the front side thereof at which the main mirror 1 is supported, so that the observation light or signal received is reflected by the main mirror 1 and the auxiliary mirror 2 to be introduced into the detector through the holes in the main mirror 1 and the main mirror support member 3.

On the other hand, when the main and auxiliary mirrors 1, 2 act as a communication instrument for the transmission of a signal, a transmitter is mounted on the back side of the main mirror support member 3 for transmitting a sending signal through aligned holes (not shown) formed through the main mirror support member 3 and the main mirror 1 so that the signal is reflected by the auxiliary mirror 2 to be further reflected by and projected from the main mirror 1.

Here, it is needless to say that a reflection mirror, a relay optical system and so on may be provided on the back side of the main mirror support member 3.

Embodiment 2.

Figure 2:
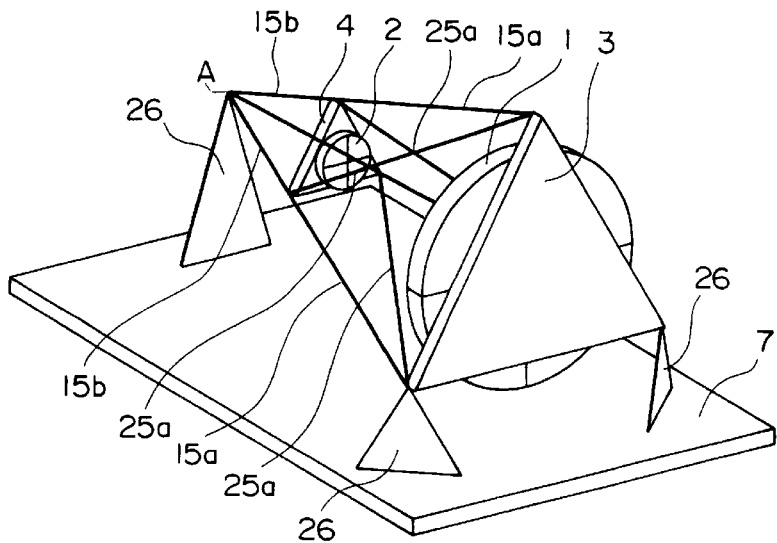
FIG. 2 is a perspective view illustrating a mirror support structure according to a second embodiment of the present invention.

FIG. 2 illustrates, in a perspective view, a mirror support structure according to a second embodiment of the present invention. In the following description of further embodiments of the present invention, the same symbols as those used in the first embodiment:are attached to the same or corresponding parts of these embodiments.

In the second embodiment, in addition to the three main rods 15a and the three auxiliary rods 15b employed in the first embodiment, the three apexes of the triangular-shaped main mirror support member 3 and non-corresponding or different three apexes of the triangular-shaped auxiliary mirror support member 4 which are not connected with each other by means of the main rods 15a are also connected with each other through additional three main rods 25a.

Owing to such a construction, a total of six sides of the main mirror support member 3 and the auxiliary mirror support member 4 plus six rods 15a, 15b and 25a cooperate with each other to construct a trussed structure comprising a total of twelve structural elements.

Also, three support legs 26 of this embodiment individually joined to the connection point A and two apexes B of the main mirror support member 3 are similar to the support legs 26 of the first embodiment 1. That is, the support legs 26 of this second embodiment, are each composed of a triangular-shaped plate spring that has high rigidity and high strength against an in-plane external force acting thereon in a direction parallel to the surface thereof and a certain degree of elasticity in an out-of-plane direction, i.e., in a direction perpendicular to the surface thereof. The three support legs 26 are arranged in such a manner that they have elasticity in different directions, respectively.

The second embodiment can provide the same effects or advantages as in the first embodiment, and in addition to these, three apexes of the main mirror support member 3 and three apexes of the auxiliary mirror support member 4 are connected with each other by means of the three additional main rods 25a, whereby the rigidity in the arrangement of the main mirror support member 3 and the auxiliary mirror support member 4 is further enhanced. As a result, in case where the mirror support structure of this embodiment is installed on a moving object in the form of a satellite, vibration resistance against the vibration load applied to the mirror support structure upon launching can be improved to a substantial extent.

Embodiment 3.

Figure 3:
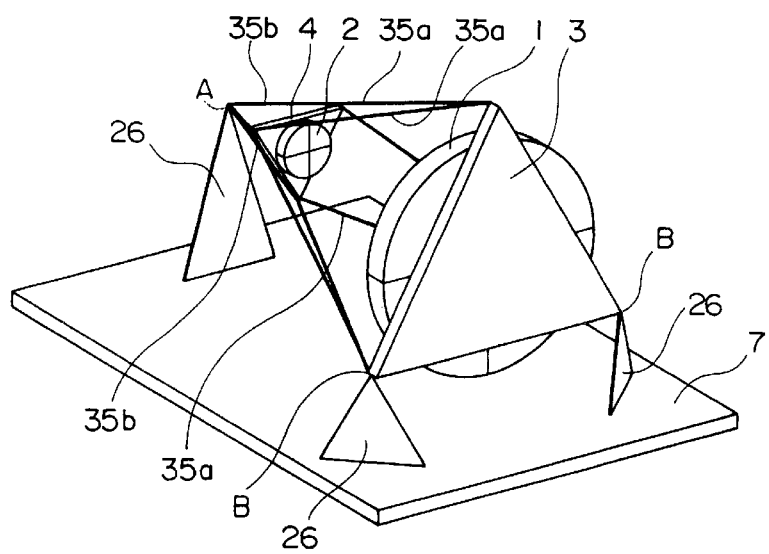
FIG. 3 is a perspective view illustrating a mirror support structure according to a third embodiment of the present invention.

FIG. 3 illustrates, in a perspective view, a mirror support structure according to a third embodiment of the present invention. In this embodiment 3, three apexes of the main mirror support member 3 and three apexes of the auxiliary mirror support member 4 are connected with each other by means of a total of six main rods 35a. Also, a plurality of auxiliary rods 35b are joined at one ends thereof to three apexes of the triangular-shaped auxiliary mirror support member 4, respectively, and at the other ends thereof to the single connection point A.

According to this construction, a total of six sides of the support members 3, 4, six main rods 35a and three auxiliary rods 35b are combined with each other to form a trussed structure comprising a total of fifteen structural elements.

Moreover, the three support legs 26 of this third embodiment individually joined to the connection point A and the two apexes B of the main mirror support member 3 are of the same construction as the support legs 26 of the first embodiment.

According to the third embodiment, there can be obtained the same effects or advantages as those in the first embodiment 1, and in addition to these, the three apexes of the main mirror support member 3 and the three apexes of the auxiliary mirror support member 4 are respectively connected with each other by means of the six main rods 35a, so that the rigidity in the arrangement of the main mirror support member 3 and the auxiliary mirror support member 4 are further improved in comparison with the mirror support structure of the first embodiment, thus enhancing the vibration resistance as well.

In addition, even if the length of each auxiliary rod 35b is shortened, there can be ensured the same degree of rigidity as in the first embodiment, as a consequence of which the axial size or distance between the main mirror 1 and the auxiliary mirror 2 of the mirror support structure can be reduced.

Embodiment 4.

Figure 4:
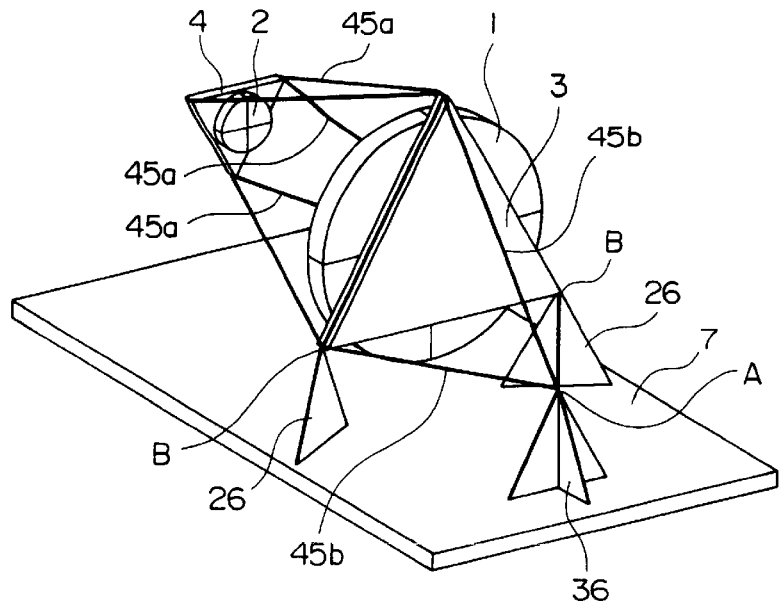
FIG. 4 is a perspective view illustrating a mirror support structure according to a fourth embodiment of the present invention.

FIG. 4 illustrates, in a perspective view, a mirror support structure according to a fourth embodiment of the present invention. In this embodiment, the triangular-shaped main mirror support member 3 and the triangular-shaped auxiliary mirror support member 4 each have one side of a triangle arranged in parallel to the base panel 7. Three apexes of the main mirror support member 3 and three apexes of the auxiliary mirror support member 4 are connected with each other by means of a total of six main rods 45a. In addition, the three apexes of the main mirror support member 3 are joined to one ends of the auxiliary rods 45b, respectively, of which the other ends are joined to the connection point A disposed apart from the main mirror 1 on one side thereof opposite the auxiliary mirror 2. Thus, a total of six sides of the support members 3, 4 and nine main and auxiliary rods 45a, 45b cooperate with each other to construct a trussed structure comprising a total of fifteen structural elements.

Moreover, three support legs 26, 36 are individually joined at their top ends or apexes to the connection point A and two apexes B of the main mirror support member 3. Among these support legs 26, 36, one support leg 36 arranged at the connection point A is composed of two triangular-shaped plate springs which are crossed with each other so as provide high rigidity in all directions, and the other support legs 26 are each composed of a single plate spring, and are arranged to have a certain degree of elasticity in a direction toward the connection point A of the three rods 45b with their normal lines disposed perpendicular to each other.

The fourth embodiment can achieve the same effects or advantages as in the third embodiment. Additionally, in comparison with the third embodiment, the main mirror support member 3 is supported by the main rods 45a and the auxiliary rods 45b in combination, so that it is further prevented from deformation against the load acting thereon, thereby improving the vibration resistance.

Moreover, since the auxiliary mirror support member 4 is supported by the main mirror support member 3 through the main rods 45a, but not directly supported on the base panel 7, there is no fear that the expansion or contraction of the base panel 7 would result in a variation in the distance between the auxiliary mirror support member 4 and the main mirror support member 3.

Embodiment 5.

Figure 5:
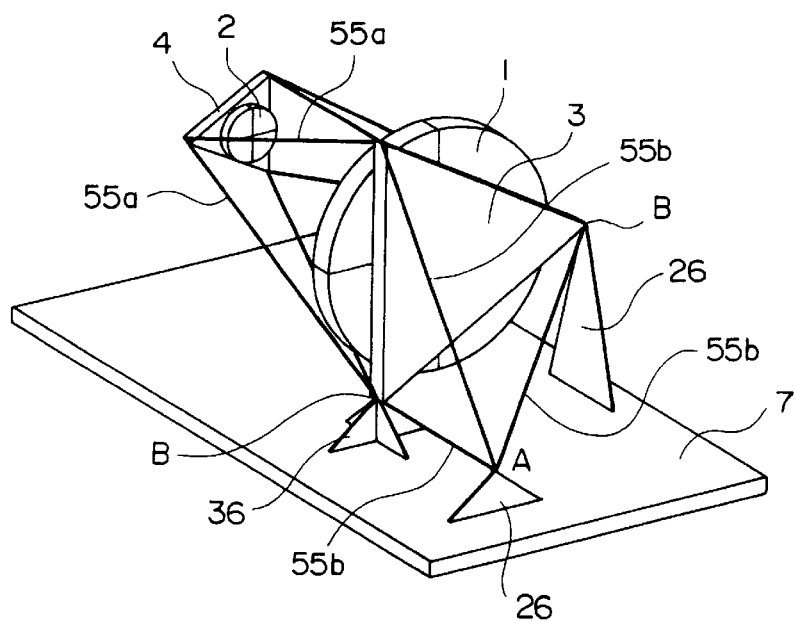
FIG. 5 is a perspective view illustrating a mirror support structure according to a fifth embodiment of the present invention.
Figure 6:
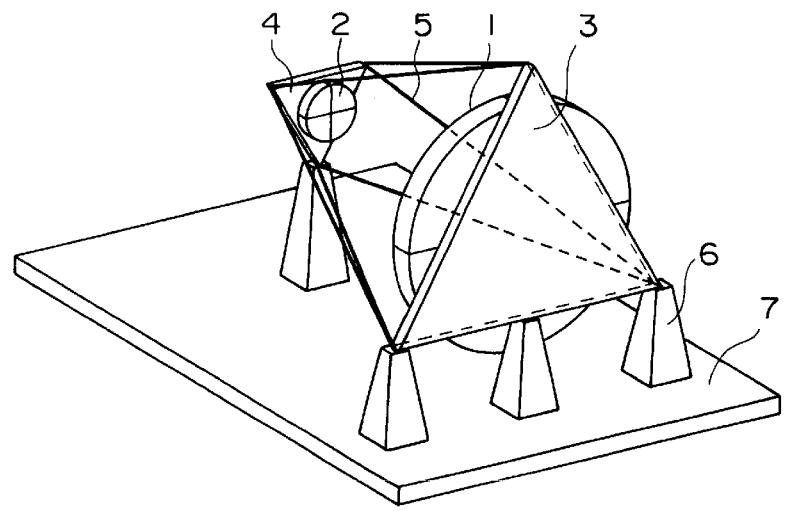
FIG. 6 is a perspective view illustrating an example of a known mirror support structure.
Figure 7:
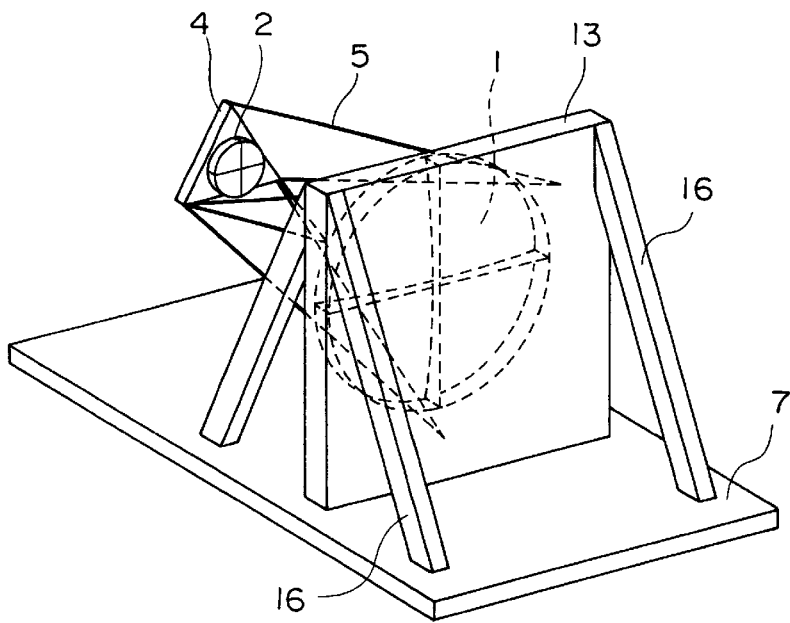
FIG. 7 is a perspective view illustrating another example of a known mirror support structure.

FIG. 5 illustrates, in a perspective view, a mirror support structure according to a fifth embodiment of the present invention, in which the triangular-shaped main mirror support member 3 and the triangular-shaped auxiliary mirror support member 4 are arranged in such a manner that they have one side of a triangle disposed perpendicular to the surface of the base panel 7. The three apexes of the main mirror support member 3 and the three apexes of the auxiliary mirror support member 4 are connected with each other by means of a total of six main rods 55a. Also, the three apexes of the main mirror support member 3 are joined to one ends of the auxiliary rods 55b, respectively, of which the other ends thereof are joined to the connection point A that is disposed apart from the main mirror 1 on one side thereof opposite the auxiliary mirror 2. Thus, a total of six sides of the support members 3, 4 and nine rods 55a, 55b cooperate with each other to provide a trussed structure comprising a total of fifteen structural elements.

In addition, three support legs 26, 36 are individually joined to the connection point A and two apexes B of the main mirror support member 3. Among these support legs 26, 36, the support leg 36 having high rigidity in all directions is arranged at and secured to one apex B of the main mirror support member 3.

The fifth embodiment can achieve the same effects or advantages as in the fourth embodiment. Additionally, the connection point A is arranged at a location offset from the center of the main mirror support member 3 (i.e., near the support leg 36 and away from the other support leg 26), so that a large free space can be provided at the side of the main mirror support member 3 opposite the main mirror 1 in comparison with the fourth embodiment, accordingly making it easy to mount peripheral equipment such as a light detector, a wave detector, optical relay components, etc.

Here, note that the triangular-shaped main mirror support member 3 may be arranged with one side thereof not perpendicular but inclined with respect to the surface of the base panel 7.

Although in the above-mentioned respective embodiments, the support legs 26 are composed of plate springs, it goes without saying that the support legs are not limited to such, but instead may comprise any form of follower members capable of following the expansion or contraction of the base panel 7, and hence they may be, for example, a mechanism called "a kinematic mount" using bearings with a certain degree of freedom of movement or rotation. Also, such a mechanism may be combined with a plate spring. In addition, it is needless to say that the shape of the main mirror support member and the auxiliary mirror support member is not limited to the triangle, but may be any other shape. Besides, the trussed structure constructed by using the main rods and the auxiliary rods is not limited to those which are shown in the above-mentioned first through fifth embodiments.

As described above, a mirror support structure according to the present invention comprises: a first mirror and a second mirror disposed a predetermined distance apart from each other in a face-to-face relation; a first mirror support member and a second mirror support member supporting the first mirror and the second mirror, respectively; a plurality of main rods connecting the first mirror support member and the second mirror support member with each other; a plurality of auxiliary rods joined at one ends thereof to the first mirror support member or the second mirror support member and at the other ends thereof to a single connection point; a plurality of support legs for indirectly supporting the first and second mirrors at a total of three points including two points on the first mirror support member and the single connection point at which the auxiliary rods are joined together; and a base on which the support legs are fixedly mounted. The support legs are composed of follower members capable of following an expansion or. contraction of the base. With this arrangement, it is possible to provide the mirror support structure which is light in weight and high in rigidity.

In addition, since the first mirror and the second mirror are supported on the base only by the three support legs, even if there takes place a distortion or an out-of-surface deformation of the base (i.e., deformation in a direction perpendicular to a surface of the base), a moment load generated on the base is not transmitted to the first and second mirrors. Also, even if there occurs an expansion or contraction of that portion of the base which lies within a triangular area defined by the three support legs, the support legs can follow such an expansion or contraction of the base so that a load causing the rods to expand or contract is not transmitted from the base to the rods via the supports legs. As a result, even in the event that there occurs an environmental variation in the place of installation or deformation of a mounting surface, the relative positional relation between the first mirror and the second mirror is maintained properly, thereby preventing any serious deformation of the first and second mirrors which would otherwise adversely affect the performance thereof.

According to a preferred form of the present invention, the first mirror support member and the second mirror support member are each composed of a triangular-shaped panel, and the main rods and the auxiliary rods comprise three pairs of main and auxiliary rods joined together in each pair to form a continuous and integral rectilinear configuration. The three pairs of continuously and integrally joined main and auxiliary rods serve to connect three apexes of the first triangular-shaped mirror support member with three corresponding apexes of the second triangular-shaped mirror support member, respectively, to cooperate with three sides of the first triangular-shaped mirror support member and three sides of the second triangular-shaped mirror support member to form a trussed structure. Thus, the main rods, auxiliary rods, the three sides of the first mirror support member and the three sides of the second mirror support member cooperate with other to form a trussed structure, thus providing a light-weight and highly rigid mirror support structure.

According to another preferred form of the present invention, the main rods comprise additional main rods connecting three apexes of the first triangular-shaped mirror support member with three different apexes of the second triangular-shaped mirror support member in combinations different from those in which the three apexes of the first triangular-shaped mirror support member and the three corresponding apexes of the second triangular-shaped mirror support member are connected with each other by means of the three pairs of continuous and integrally joined main and auxiliary rods. Accordingly, the rigidity in an assembly or arrangement of the first mirror support member and the second mirror support member is further improved. For example, in case the mirror support structure is installed on a moving object in the form of a satellite, it is possible to enhance the vibration resistance of the mirror support structure to a vibration load applied thereto upon launching of the satellite.

According to a further preferred form of the present invention, the first mirror support member and the second mirror support member are each composed of a triangular-shaped panel, and the main rods comprise six main rods connecting three apexes of the first mirror support member and three apexes of the second mirror support member, respectively. The auxiliary rods comprise three auxiliary rods joined to three apexes of the second mirror support member, respectively, the six main rods and the three auxiliary rods cooperating with three sides of the first triangular-shaped mirror support member and three sides of the second triangular-shaped mirror support member to form a trussed structure. Thus, an assembly or arrangement of the first mirror support member and the second mirror support member becomes high in rigidity and vibration resistance.

In addition, the lengths of the auxiliary rods can be shortened to accordingly make the entire mirror support structure compact while ensuring the rigidity of the second mirror support member.

According to a still further preferred form of the present invention, the first mirror support member and the second mirror support member are each composed of a triangular-shaped panel, and the first triangular-shaped mirror support member and the second triangular-shaped mirror support member are arranged such that they have one side disposed in parallel with a surface of the base. The main rods comprise six main rods connecting three apexes of the first triangular-shaped mirror support member and three apexes of the second triangular-shaped mirror support member with each other. The auxiliary rods comprise three auxiliary rods joined to the three apexes of the first triangular-shaped mirror support member, respectively, the six main rods and the three auxiliary rods cooperating with three sides of the first triangular-shaped mirror support member and three sides of the second triangular-shaped mirror support member to form a trussed structure. Thus, the first mirror support member is supported by the main rods and the auxiliary rods so that it is further prevented from deformation against a load applied thereto and becomes high in vibration resistance.

Moreover, since the second mirror support member is supported on the base not directly but through the first mirror support member, there will be no variation in the distance between the first and second mirror support members resulting from an expansion or contraction of the base.

According to a yet further preferred form of the present invention, the first mirror support member and the second mirror support member are each composed of a triangular-shaped panel, and the first triangular-shaped mirror support member and the second triangular-shaped mirror support member are arranged such that they have each side disposed in antiparallel with a surface of the base. The main rods comprise six main rods connecting three apexes of the first triangular-shaped mirror support member and three apexes of the second triangular-shaped mirror support member with each other. The auxiliary rods comprise three auxiliary rods joined to three apexes of the first triangular-shaped mirror support member, respectively, the six main rods and the three auxiliary rods cooperating with three sides of the first triangular-shaped mirror support member and three seides of the second triangular-shaped mirror support member to form a trussed structure. Accordingly, as referred to above, the first mirror support member, being supported by the main rods and the auxiliary rods, is further prevented from deformation against a load applied thereto and hence becomes high in vibration resistance. In addition, the second mirror support member is supported on the base not directly but through the first mirror support member, so that there will be no variation in the distance between the first and second mirror support members resulting from an expansion or contraction of the base.

According to a further preferred form of the present invention, the follower members are each composed of a plate spring, so that they can follow the expansion or contraction of the base with such a simple construction.

What is claimed is:

1. A mirror support structure comprising:
   a first mirror and a second mirror disposed a predetermined distance apart from each other in a face-to-face relation;
   a first mirror support member and a second mirror support member supporting said first mirror and said second mirror, respectively;
   a plurality of main rods connecting said first mirror support member and said second mirror support member with each other;
   a plurality of auxiliary rods joined at one ends thereof to said first mirror support member or said second mirror support member and at the other ends thereof to a single connection point;
   a plurality of support legs for indirectly supporting said first and second mirrors at a total of three points including two points on said first mirror support member and said single connection point at which said auxiliary rods are joined together; and
   a base on which said support legs are fixedly mounted; wherein said support legs are composed of follower members capable of following an expansion or contraction of said base.

2. The mirror support structure as claimed in claim 1, wherein said first mirror support member and said second mirror support member are each composed of a triangular-shaped panel, and said main rods and said auxiliary rods comprise three pairs of main and auxiliary rods joined together in each pair to form a continuous and integral rectilinear configuration, said three pairs of continuously and integrally joined main and auxiliary rods serving to connect three apexes of said first triangular-shaped mirror support member with three corresponding apexes of said second triangular-shaped mirror support member, respectively, to cooperate with three sides of said first triangular-shaped mirror support member and three sides of said second triangular-shaped mirror support member to form a trussed structure.

3. The mirror support structure as claimed in claim 2, wherein said main rods comprise additional main rods connecting three apexes of said first triangular-shaped mirror support member with three different apexes of said second triangular-shaped mirror support member in combinations different from those in which the three apexes of said first triangular-shaped mirror support member and the three corresponding apexes of said second triangular-shaped mirror support member are connected with each other by means of said three pairs of continuous and integrally joined main and auxiliary rods.

4. The mirror support structure as claimed in claim 1, wherein said first mirror support member and said second mirror support member are each composed of a triangular-shaped panel, and said main rods comprise six main rods connecting three apexes of said first mirror support member and three apexes of said second mirror support member, respectively, and said auxiliary rods comprise three auxiliary rods joined to three apexes of said second mirror support member, respectively, said six main rods and said three auxiliary rods cooperating with three sides of said first triangular-shaped mirror support member and three sides of said second triangular-shaped mirror support member to form a trussed structure.

5. The mirror support structure as claimed in claim 1, wherein said first mirror support member and said second mirror support member are each composed of a triangular-shaped panel, and said first triangular-shaped mirror support member and said second triangular-shaped mirror support member are arranged such that they have one side disposed in parallel with a surface of said base, and said main rods comprise six main rods connecting three apexes of said first triangular-shaped mirror support member and three apexes of said second triangular-shaped mirror support member with each other, and said auxiliary rods comprise three auxiliary rods joined to the three apexes of said first triangular-shaped mirror support member, respectively, said six main rods and said three auxiliary rods cooperating with three sides of said first triangular-shaped mirror support member and three sides of said second triangular-shaped mirror support member to form a trussed structure.

6. The mirror support structure as claimed in claim 1, wherein said first mirror support member and said second mirror support member are each composed of a triangular-shaped panel, and said first triangular-shaped mirror support member and said second triangular-shaped mirror support member are arranged such that they have each side disposed in antiparallel with a surface of said base, and said main rods comprise six main rods connecting three apexes of said first triangular-shaped mirror support member and three apexes of said second triangular-shaped mirror support member with each other, and said auxiliary rods comprise three auxiliary rods joined to three apexes of said first triangular-shaped mirror support member, respectively, said six main rods and said three auxiliary rods cooperating with three sides of said first triangular-shaped mirror support member and three sides of said second triangular-shaped mirror support member to form a trussed structure.

7. The mirror support structure as claimed in claim 1, wherein said follower members are each composed of a plate spring.

* * * * *